Patented Feb. 5, 1952

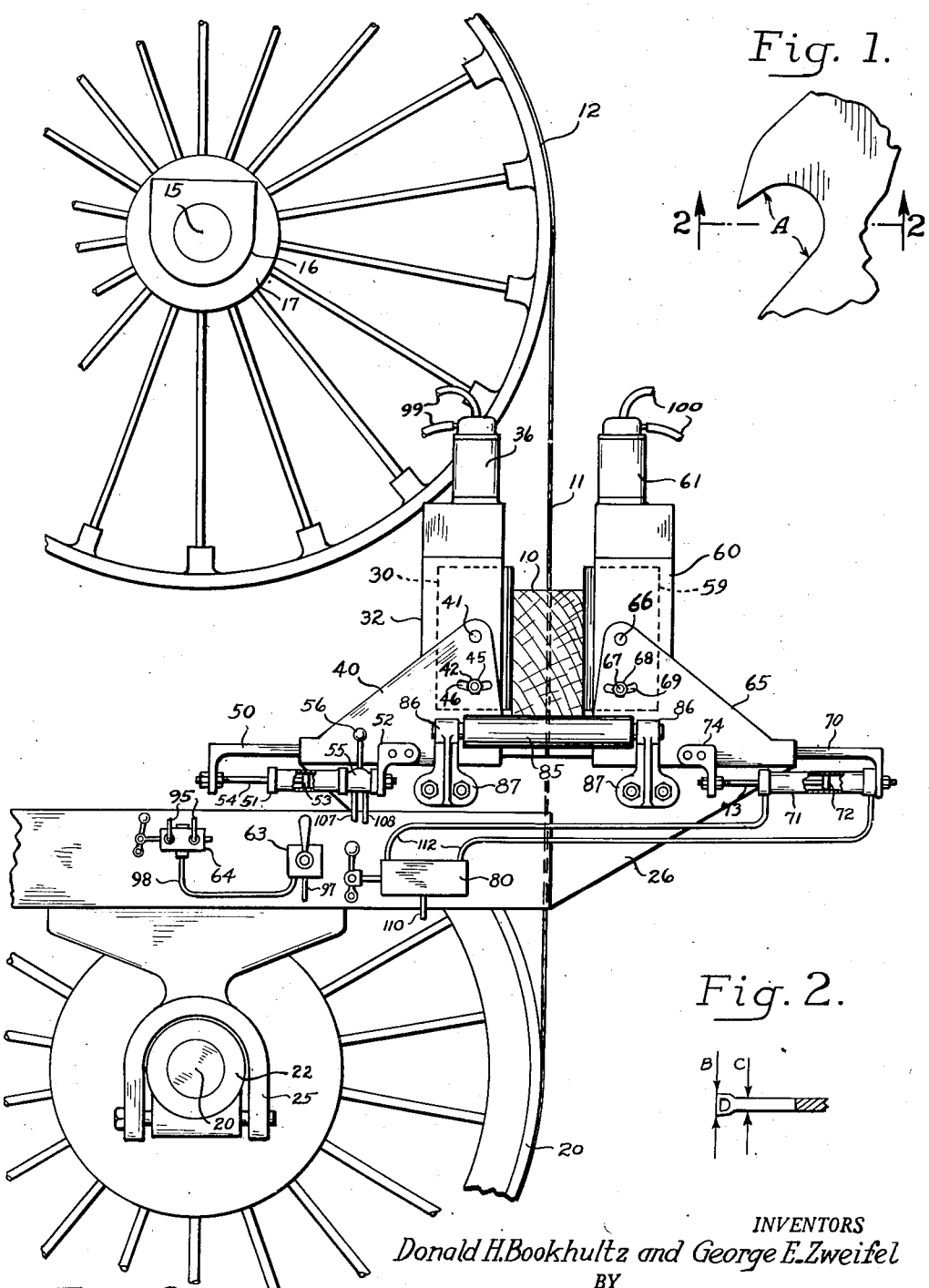

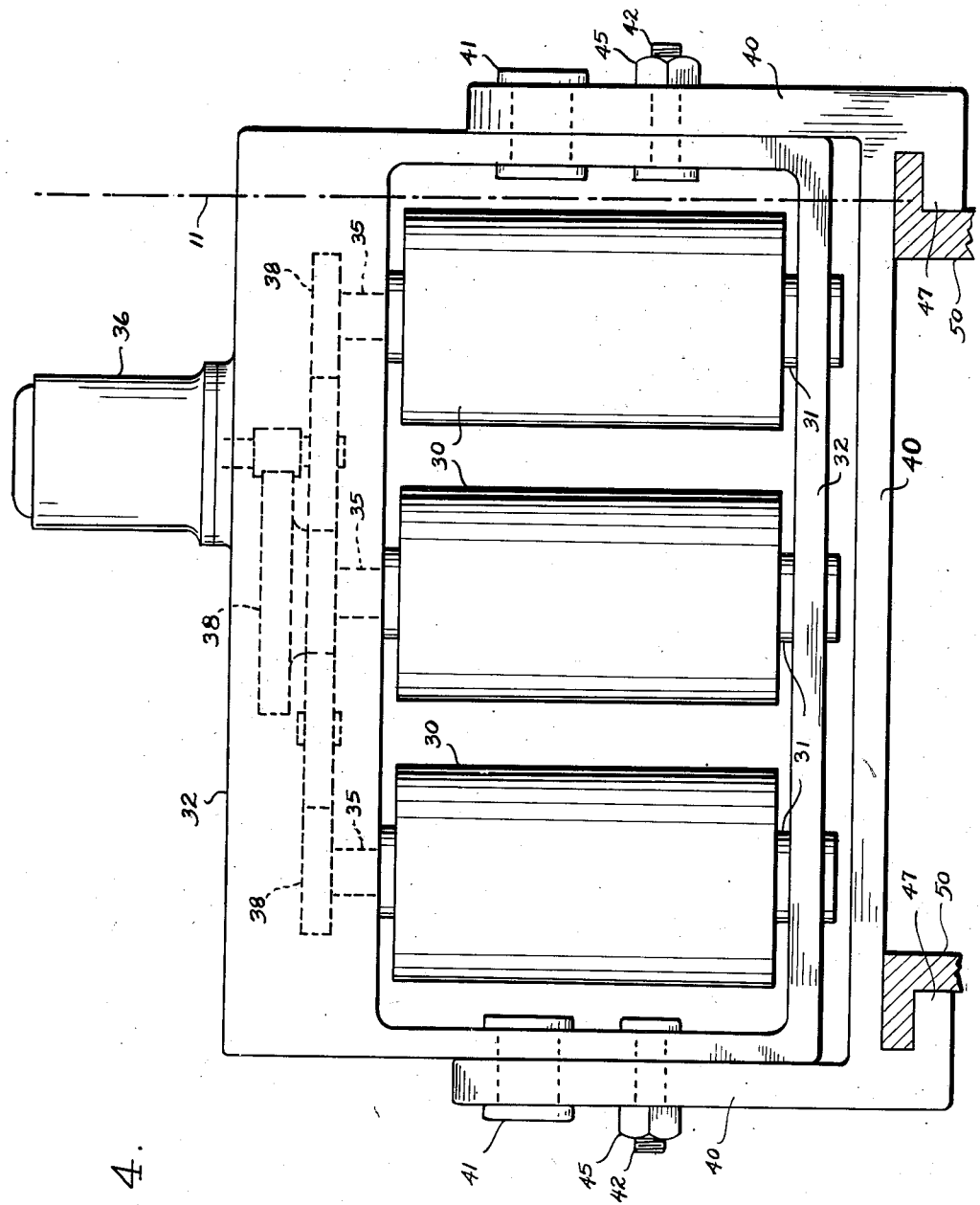

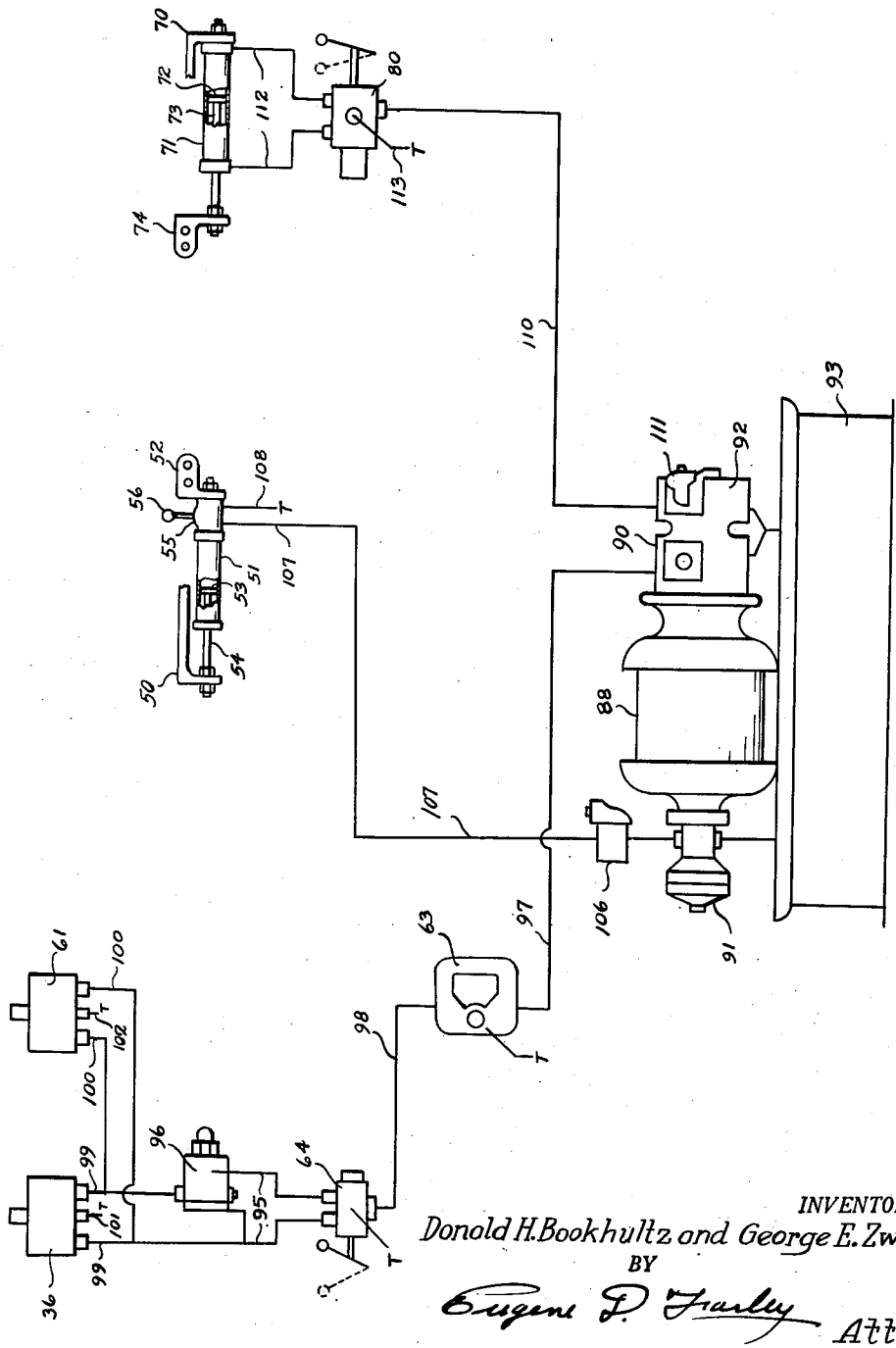

2,584,837

UNITED STATES PATENT OFFICE 2,584,837

HYDRAULIC RESAW SETWORK

Donald H. Bookhultz and George E. Zweifel, Portland, Oreg., assignors to George E. Zweifel & Company, Portland, Oreg., a partnership Application May 20, 1947, Serial No. 749,388

3 Claims. (Cl. 143—4)

This invention relates to hydraulically actuated apparatus for feeding wood to a saw. More particularly the invention pertains to hydraulically actuated setworks for accurately positioning large timbers or cants with respect to a resaw and for feeding them thereto.

In the drawings,

Figure 1 is a fragmentary side elevation of a portion of a saw illustrating the form and relative proportions of the teeth;

Figure 2 is an edge view, partly in section, of a saw tooth taken along the line 2—2 of Figure 1;

Figure 3 is an elevation of the infeed side of the hydraulic setworks of the invention shown in relationship to a band saw with which it cooperates;

Figure 4 is a side elevation of the set roll assembly viewed from the inside; and Figure 5 is a diagrammatic representation of the hydraulic system used for actuating the driven members of the setworks of the invention.

The resaw, which is standard equipment in the average sawmill, saws large timbers or cants coming from the head rigs into smaller timbers or into boards. In the usual form, it comprises a band saw of substantial size having in conjunction therewith means for positioning the cant and for urging it against the saw to cut a board of desired dimensions. The combination of positioning and feeding means customarily is termed the "setworks." It comprises two groups of power-driven rollers. These usually are in a vertical position, although in some resaws they may be disposed horizontally. That group which lies inside the plane of the saw is called the "set roll." It is capable of precise lateral adjustment so that the space between the plane of the saw and the outer periphery of the rollers may be varied to cut a board of given thickness. Means also are present for driving the rollers to urge the timber being processed against the saw.

Disposed opposite the set roll and outside the plane of the saw is another group of rollers and related members called the "press roll." It cooperates with the set roll in feeding a cant to the saw. It also exerts lateral or clamping pressure against the cant to position it firmly against the set roll so that a board of uniform thickness will be sawed. To accomplish these functions it is provided with means similar to those present in the set roll for rotating the rollers, and for adjusting the assembly laterally so that cants of varying cross section may be accommodated. Means also are provided, however, for maintaining lateral pressure against the cant during the entire period in which it traverses the space between press roll and set roll.

In the setworks cooperating with a band saw of the usual resaw assembly there are thus present three separate and independently controlled power-driven means; i. e., the means for driving the rollers of the press roll and the set roll, the means employed to secure the lateral adjustment of the set roll with respect to the saw, and the means used to actuate the press roll so that it exerts clamping pressure against the side of the cant and so that it is capable of lateral adjustment. In each of these means as employed in the prior art devices there are certain inherent defects which tend to reduce the efficiency of the assembly.

There have been, for example, certain inherent deficiencies of electrical, steam and pneumatic drives as applied to the driving of the rollers in both set roll and press roll. The rate at which these rollers are driven determines the speed with which the cant is fed to the saw. Because of the manner of construction of the saw, this rate is of critical importance in determining the efficiency of the sawing operation and the quality of the product obtained. A saw comprises a plurality of teeth on a body portion. Between the teeth are cavities termed "gullets" (indicated at A in Figure 1). These serve the function of carrying away the sawdust cut from the log by the cutting points of the teeth. The width of the cutting points is greater than that of the body portion of the saw by an amount equal to the difference between the dimensions designated B and C in Figure 2. Hence the cut or kerf is made sufficiently wide to provide clearance between the body of the saw and the solid wood. This allows the saw to move freely within the kerf without binding or friction.

If the rate at which the cant is driven against the saw is too slow, the saw will not cut enough wood to fill the gullets completely and as a consequence it will operate at reduced efficiency. It will also consume more power by cutting the sawdust too fine. If, on the other hand, the cant is driven against the saw too rapidly, more sawdust is formed than can be carried away in the gullets and proper chambering of the sawdust is not obtained. The surplus packs and wedges in the kerf and friction develops. This causes the blade to heat up, whereupon it loses its tension, wavers, and does not cut in a straight line. There thus is a certain optimum speed at which a cant must be advanced against the saw if maximum cutting efficiency and optimum performance are to be obtained.

Uniform movement of the cant at optimum speed is made difficult by numerous factors. The cutting speed varies with the length and thickness of the cants. Long cants and cants which are thick are cut at different rates than are short cants or cants of relatively small cross section. When a given cant is of irregular thickness, as when it is tapered, the speed varies with the thickness of the portion being cut. The density of the wood is also a significant factor, hard woods being cut more slowly than soft woods.

Electric motors, steam engines and pneumatic engines which, as has been indicated above, have comprised the prime movers by means of which the resaw setworks have been driven, have not been susceptible to the precise control required to maintain the cutting speed of the resaw at uniform, optimum levels. Electric motors operate at either a single speed or at step speeds and hence are not infinitely variable as is necessary to vary the speed to accommodate cants of all types. Furthermore, the speed of an electric motor is variable with the load applied. When the load increases, as when the saw meets increased resistance, the motor speed decreases and, conversely, when the load is reduced, the speed of the motor increases correspondingly.

Similarly, the speed of steam and pneumatic engines is variable. Because of fluctuating pressures in the steam or air lines, they operate at varying speeds even at given settings of the controls. Moreover, like electric motors, their operating speeds are dependent upon the load applied. When the load is increased, the vaporous medium through which power is transmitted is compressed, with the result that the speed of the engine is decreased. However, when the load is reduced or released, the compressed medium expands, thereby accelerating the motion of the engine. These factors impart to their operation an erratic and irregular speed which is transmitted to the units of the resaw which they drive.

Certain defects also have been inherent in the means heretofore employed for positioning the set roll with respect to the blade of the saw. These have comprised mechanical adjustments such as racks and pinions, screws, and the like. The operation of these devices has been unsatisfactory principally because of their lack of precision. Since several parts are involved in the linkages, the play existing therebetween makes an exact setting impossible, especially after wear has occurred. Secondly, because of their great weight, they are difficult to operate, particularly when the ways in which the set roll moves are filled with sawdust, as is often the case in the normal operation of the unit. Furthermore, they are incapable of adjustment by remote control and demand the presence of an operator at the set roll when each adjustment is to be made.

Means heretofore employed for securing the lateral adjustment of the press roll and for securing a constant clamping pressure exerted thereby against the side of the cant have comprised steam and air cylinders and mechanical means such as spring loaded mechanisms. Steam and pneumatic cylinders have the disadvantages heretofore pointed out of being incapable of precise control so that uniform pressure is applied against the cant. These means, in common with spring loaded mechanisms, therefore result in the application to the cant of variable clamping pressures, particularly when the cant is tapered or otherwise is of irregular cross section. As a result, the rolls tend to slip or to bind as they act upon the cant. This makes the saw vibrate and cut unevenly.

Spring loaded mechanisms have the added disadvantage of being awkward and difficult to adjust, it being necessary to screw them out manually to form a large aperture between set roll and press roll when introducing a cant of large cross section therebetween, and to screw them in again when operating upon a smaller cant.

In addition to the deficiencies which are particular to the individual driving mechanisms, i. e. the means driving the rollers, those adjusting the set roll, and those adjusting the press roll, the apparatus of the prior art has been characterized by lack of integration of these various units. Separate controls and separate sources of power have been employed for each. It has not been possible to control the apparatus entirely from a position remote from the resaw, as from a position adjacent a live roll track by means of which the cants are fed into the machine. The apparatus has been hazardous to operate, both to operating personnel and to the lumber processed, because of the danger of personnel being drawn between the rollers, and because of damage which may be done to the lumber by faulty operation of the saw and by fire. There has been the further hazard, that because of the difficulty of controlling the movement of the cant between the rolls, it frequently is impossible to stop its motion with sufficient speed to prevent the saw from being damaged or pushed off the driving wheels when it strikes a rock or metal object buried in the cant.

It is, therefore, the general object of the present invention to provide a resaw setworks which comprises an integrated, efficient unit which is easy to operate and which is subject to precise control.

It is a further object to provide a setworks for a resaw, the controls of which may be grouped together at some convenient location which may be remote from the saw.

A further object is to provide apparatus for feeding cants against a saw which apparatus is relatively simple and has a minimum of operating parts.

A further object is to provide a setworks for a resaw which may be operated at a minimum of hazard to personnel and to the material processed.

A further object is to provide a resaw setworks the rollers of which may be rotated at a controlled and steplessly variable speed calculated to urge a cant positioned therebetween against the saw at an optimum cutting speed throughout the entire cutting operation.

A further object is to provide means in a resaw setworks for securing the precise lateral adjustment of set roll and press roll with respect to the saw.

A further object is to provide in a resaw setworks means for securing a uniform and optimum pressure of the press roll against the side of the cant.

It is the essence of the present invention that the foregoing and other objects may be accomplished by the application of suitable hydraulically driven mechanisms to the actuation of the rollers of the set roll and press roll, to the lateral adjustment of the set roll and press roll with respect to the saw, and to the application of clamping pressure by the press roll against the cant. The manner in which this is accomplished will be apparent from a consideration of the following specification and claims considered together with the drawings.

In Figures 3 and 4, a cant 10 is represented in process of being operated upon by the band saw 11. The saw rides on a pair of wheels, the upper wheel 12 being mounted on a shaft or arbor 15 journalled in the bearing 16 which is supported by the member 17. The lower wheel 20, which drives the saw, is similarly mounted, its arbor 21 being journalled into the bearing 22 supported by the yoke 25.

The setworks which feeds the saw, comprises the set roll, the press roll and related members mounted upon a base 26 or supporting structure on the infeed side of the saw, the set roll being inside and the press roll being outside the plane thereof.

The set roll

The set roll assembly comprises a plurality of rollers 30, 30, 30 preferably three in number, rotatably mounted in substantial alignment and positioned with their axes substantially parallel to the cutting portion of the saw. The rollers preferably have a rough surface, e. g. a fluted surface, so as to engage the cant firmly. The ends of the rollers are provided with shafts, the lower shafts 31, 31, 31 being journalled into the bottom of a framework or housing 32 and the upper shafts 35, 35, 35 being journalled into the opposite side of the same housing.

The rollers of the set roll assembly are driven by the hydraulic motor 36, which is mounted on the housing or "husk" 32. The motor is of the variable speed, rotary type and is supplied with hydraulic fluid under pressure in a manner to be described hereinafter. It is attached through a suitable gear reduction train, indicated generally at 38, 38, 38 to the upper shafts of the rollers.

It will be apparent that as a consequence of the fact that many of the cants processed by the resaw are of relatively small cross section and contact only the lower portion of the rollers, the latter will be worn unevenly with use over a period of time, the greatest wear occurring on the lower portions. As a result, the space between the periphery of the saw and the rollers, which determines the thickness of the cut, will vary and will affect the dimensions of the lumber sawed. To compensate for this, means are provided for tilting the set roll assembly periodically so that the lower portions of the rollers are shifted toward the saw by an amount sufficient to correct for the amount of wear. This is accomplished by pivotally mounting the entire assembly on a supporting member 40 through the oppositely disposed trunnion bearings 41, 41.

The set roll assembly is locked in the adjusted position by means of the bolts 42, 42 with nuts 45, 45. The bolts penetrate the housing 32 and extend through slots, one of which is indicated at 46, in the support member 40. Thus, the desired adjustment of the set roll may be secured and maintained by loosening the nuts on the bolts, tilting the set roll to the extent desired, and then tightening the nuts. It will be apparent to one skilled in the art, however, that alternate means may be employed to secure such adjustment, as stops affixed to the bottom of the support member 40 and connected through an adjustable screw to the housing 32, or otherwise.

To make possible the lateral adjustment of the set roll assembly with respect to the cutting portion of the saw, the entire assembly is slidably mounted on the slides 47, 47 which preferably are formed integrally with the support member 40 and which are adapted to move on the guide members 50, 50. It is adjusted by means of a reciprocable hydraulic ram the cylinder 51 of which is attached through the bracket 52 to the slidably mounted support member 40, and the piston 53 of which is connected through the piston rod 54 to a bracket on the base of the setworks or to an extension of one of the guide members 50. Control of the velocity and direction of motion of the ram is had through the valve 55 and control lever 56 which operate to route fluid to one side or the other of the piston 53. The valve preferably is attached to the cylinder 51 and is supplied with fluid under pressure from a hydraulic pump as more fully is described below. Suitable adjustment of the valve thus causes displacement of the piston and movement of the set rolls to a new and predetermined position.

Press roll

The construction of the press roll assembly is very similar to that of the set roll assembly illustrated in Figure 4. It comprises a plurality of fluted rollers, one of which is indicated at 59 in Figure 3, rotatably mounted in a housing 60 and operatively connected through a gear train to the hydraulic motor 61. This motor cooperates with the set roll motor 36 and like it is of the variable speed, rotary type. It is supplied with hydraulic fluid from the same pump that supplies fluid to the set roll motor. Set roll and press roll thus are driven independently of each other mechanically, but are tied together hydraulically. Their speed and direction or rotation are controlled by means of the throttle valve 63 and the reversing valve 64 which preferably are affixed to the frame of the saw at some point convenient to the operator. These two valves are so constructed that the throttle valve controls the volume of hydraulic fluid supplied to the motors 36 and 61 in a unit time, and hence their speed, while the reversing valve controls the direction of flow of the fluid through the motors, and hence their direction of rotation.

Tilting of the press roll to compensate for wear on the lower portion of the rollers is accomplished in the same manner as in the case of the set roll. The housing 60 containing the rolls is mounted on a supporting member 65 through oppositely disposed trunion bearings one of which is indicated at 66. After tilting, the assembly is locked in position by means of bolts extending through the housing and through the supporting member 65. These bolts are disposed on opposite sides of the assembly, one of them 67 with nut 68 extending through the slot 69 in the supporting member 65.

The press roll, like the set roll, may be adjusted laterally with respect to the saw, the adjustment being made in this instance to accommodate cants of varying sizes between the rollers. Thus, the press roll is mounted on slides which preferably are formed integrally with the support member 65 and which are adapted to move on guides, one of which is indicated at 70, attached to or formed integrally with the base of the setworks. It is adjusted laterally with respect to the saw as required by the size of the cant by means of a reciprocable hydraulic ram, the cylinder 71 of which is attached to the press roll assembly, as by being attached to an extension on the guide 70. Within the cylinder slides the piston 72 which is attached through the piston rod 73 to the bracket 74 on the support member 65.

The press roll ram is adapted to exert sustained clamping pressure on the cant as it passes through the setworks, the amount of presure being variable as required for optimum operation of the unit. It is controlled by means of the four-way valve 80, which may be positioned adjacent the controls for the hydraulic motors for the press roll and set roll and the control for the set roll ram. This valve is adapted to direct the fluid flow to one side or the other of the piston 72, thereby effecting its reciprocation. It is supplied with fluid under pressure from a suitable hydraulic pump as is hereinafter described.

Also present on the setworks assembly is the roller 85 rotatably attached through bearings 86, 86 to the brackets 87, 87. This roller serves the function of co-operating with other rollers in a live roll assembly to feed the cant into the setworks.

The hydraulic system

Details of the hydraulic system controlling the operation of the various hydraulic units of the setworks assembly are illustrated in Figure 5. A large, constant speed electric motor 88 drives three separate hydraulic pumps indicated respectively at 90, 91 and 92. These may all be driven from the shaft of the electric motor and, therefore, operate at the same speed. The entire unit comprising the electric motor and the three pumps is mounted on the tank or reservoir 93 in which hydraulic fluid is stored and to which it is returned through the lines designated throughout the figure by the symbol T.

The hydraulic system through which fluid under pressure is supplied to the hydraulic motors 36 and 61 which drives, respectively, the set roll and the press roll, comprises the variable displacement pump 90, the throttle valve 63, the reversing valve 64, preferably an equalizing valve 96, and interconnecting flow lines or conduits. When the motor 88 is running, it turns the variable displacement pump 90 at constant speed. The amount of fluid fed by the pump to the hydraulic circuit is determined by the setting of the throttle valve 63. When this valve is in neutral or idling position, the pump displaces and delivers substantially no fluid. The hydraulic motors 36 and 61 therefore remain idle. However, as the throttle valve is advanced, the pump displaces and delivers through line 97 a steplessly variable flow of fluid. This passes through the throttle valve; through line 98, to the reversing valve, which determines the direction of flow through the rest of the circuit; through the lines 95 to the equalizing valve 96, which equalizes the flow between the two motors; through one of the lines 99, 99 (as determined by the setting of the reversing valve) to the motor 36; and through one of the lines 100, 100 to the motor 61 which is in parallel with motor 36. Fluid exhausted from the motors is returned to the tank through the lines 101 and 102. The two motors thus are tied together hydraulically and are governed by adjustment of the same controls, although they operate as independent mechanical units.

The hydraulic circuit by means of which the set roll positioning ram is operated comprises the constant displacement pump 91, the relief valve 106 and the four-way valve 55 attached to the cylinder 51. These units are interconnected by the infeed line 107. Fluid exhausted from the cylinder is returned to the tank through line 108. When valve 55 is in neutral position, there is substantially no flow of fluid through the circuit and the cylinder remains stationary. However, upon movement of the control lever the flow is initiated and the ram is extended or retracted. This moves the set roll together with the attached cylinder and valve to a new position as desired.

The relief valve is included in the circuit to relieve the pressure when the motion of the set roll is impeded. It therefore serves a safety function.

The hydraulic circuit for the press roll assembly comprises the adjustable pressure, constant displacement hydraulic pump 92 supplying fluid through the line 110 to the four-way valve 80 which controls the direction and velocity of motion of the press roll positioning ram. The pump is provided with the presure adjustment 111 which enables application of variable and sustained presure through the ram to the cant upon which the press roll operates. As in the case of the set roll positioning cylinder, there is no flow of hydraulic fluid through the circuit when the control valve 80 is in neutral position. However, upon suitable movement of the control lever, the flow of fluid is initiated through lines 112 so that the ram may be actuated to adjust the position of the press roll and to maintain pressure on the cant. Fluid exhausted from the cylinder during operation of the ram is returned to the tank through line 113.

Operation

In operation of the resaw, a cant is fed between the rollers of the set roll and press roll. These are driven by means of the hydraulic motors 36 and 61 at a speed calculated to advance the cant against the saw at an optimum rate at which the saw operates at maximum efficiency, i. e. at which the gullets between the saw teeth are filled to capacity with sawdust without surplus sawdust wedging in the kerf. Since the speed of the motors is a function only of the amount of hydraulic fluid pumped therethrough and is independent of the load placed upon them, they may be operated at a constant, predetermined speed which is the optimum for a cant of given dimensions and type. However, when it is necessary to vary the speed of the motors, as when cants of varying thickness or density are being processed, the speed of the motors is steplessly and instantly variable to protect the saw from damage or to maintain its cutting efficiency. Furthermore, substantially instantaneous and cushioned stopping of the motion of the cant may be obtained at any point during the cut, or if desirable or necessary the direction of motion of the cant may be completely reversed.

The set roll and press roll also may be operated with comparative safety to the personnel of the mill. Since the hydraulic motors driving each are mechanically independent of each other but are connected in parallel hydraulically, one of the rollers may be stopped manually, whereupon the quantity of hydraulic fluid passing through the other motor will be doubled and the speed of the rolls which it drives likewise is doubled. It is only when a cant is introduced between the rollers that power is applied equally to each of the motors and they divide the load equally between them. As a consequence, it is a virtual impossibility for a person to become entangled between the rollers of either set roll or press roll when they are running free.

Positioning of the set roll with respect to the blade of the saw in order to determine the thickness of board to be sawed from the cant is readily possible by means of the hydraulic positioning cylinder 51. The adjustment is precise and is easy to make by a simple adjustment of the control lever, which moves the piston of the ram to a desired extent in either direction and thereby positions the set roll. The positioning apparatus is compact and simple. It is not subject to interference by the presence of sawdust, as is a mechanical apparatus, nor are there mechanical linkages which wear and thus negative the precision of the apparatus.

Lateral adjustment of the press roll with respect to the saw is secured by adjustment of the positioning cylinder 71 by suitable adjustment of the control lever. This enables accommodating cants of varying widths between the rollers of the set roll and press roll. Since the positioning cylinder is also adapted to exert a given pressure against the framework of the press roll, the latter exerts a clamping action against the cant and holds it firmly in place. The clamping pressure thus exerted is uniform and is not variable as is the case with steam cylinders, pneumatic cylinders or spring loaded mechanisms. As a result there is no binding or slippage of the cant and the saw makes a true cut therethrough. Since the pressure applied to the press roll is constant, the press roll follows the irregularities when cants of irregular dimension, as tapered cants, are introduced into the set works, exerting a constant pressure throughout the operation.

In addition to the specific advantages attendant upon the application of hydraulic actuation to the motors driving the set roll and the press roll, to the set roll positioning cylinder and to the press roll positioning cylinder, there are general advantages attending the overall application of hydraulic actuation to these various mechanisms. It provides for the first time integrated means for driving these three units from a common power source. It is also possible for the first time to operate the setworks from a remote position. This is desirable since it enables a single operator stationed midway down a live roll assembly feeding cants into the resaw to have available to him but three control levers closely grouped together, each of which operates one unit of the setworks.

The driving mechanism is simplified to a minimum of mechanical parts and linkages. This permits operation of the resaw with the greatest degree of precision, economy and freedom from vibration.

Hazards attendant upon operation of the assembly also are largely minimized. The danger of operating personnel becoming fouled in the rollers when they are freely revolving is negatived by the fact that either set of rollers may be stopped manually by reason of the diversion of hydraulic fluid to the other set of rollers when resistance is met by the first set. Furthermore, the fire hazard to the mill is greatly reduced because of the absence of steam power plants.

Having now described our invention in preferred embodiments, what we claim as new and desire to protect by Letters Patent is:

1. In combination with a resaw, setworks comprising a base, a set roll frame slidably mounted on said base, a plurality of rollers rotatably mounted in said set roll frame, a first fluid operated rotary motor operably connected to said rollers in said set roll frame, valve means for controlling said first fluid operated rotary motor, a first hydraulic cylinder, a piston therein operatively connected to said set roll frame, valve means for directing the flow of fluid to the respective sides of said piston in said first hydraulic cylinder, whereby to secure the reciprocation thereof and the lateral adjustment of said set roll frame, a press roll frame slidably mounted on said base, a plurality of rollers rotatably mounted in said press roll frame, a second fluid operated rotary motor operably connected to said rollers in said press roll frame, valve means for controlling said second fluid operated rotary motor, a second hydraulic cylinder, a piston therein operatively connected to said press roll frame, valve means for directing the flow of fluid to the respective sides of said piston in said second hydraulic cylinder whereby to secure the reciprocation thereof and the lateral adjustment of said press roll frame and the exertion of clamping pressure by the rollers therein, a variable displacement rotary pump, conduit means interconnecting the same and said first and said second rotary hydraulic motors and the valve means therefor, a constant displacement pump, conduit means interconnecting the same and said first hydraulic cylinder and the valve means therefor, a constant displacement variable pressure pump, and conduit means interconnecting the same and said second hydraulic cylinder and the valve means therefor.

2. In a resaw, a set roll assembly slidably mounted on the frame of the resaw, a first hydraulic cylinder, a piston therein operably connected to the set roll assembly, valve means for directing the flow of fluid to the respective sides of the piston in the first hydraulic cylinder whereby to secure the reciprocation thereof and the lateral adjustment of the set roll assembly, a press roll assembly slidably mounted on the frame of the resaw, a second hydraulic cylinder, a piston therein operably connected to the press roll assembly, second valve means for directing the flow of fluid to the respective sides of the piston in the second hydraulic cylinder whereby to secure the reciprocation thereof and the lateral adjustment of the press roll assembly and the exertion of clamping pressure by the rolls therein, a constant displacement pump, conduit means interconnecting the same and the first valve means and the first hydraulic cylinder, a constant displacement variable pressure pump, and conduit means interconnecting the same and the second valve means and the second hydraulic cylinder.

3. Resaw setwork comprising a base, a set roll frame slidably mounted on said base, a plurality of rollers rotatably mounted in said set roll frame, a first fluid operated rotary motor operably connected to said rollers in said set roll frame, valve means for controlling said first fluid operated rotary motor, an hydraulic motor connected to said set roll frame for securing the lateral adjustment of the same, valve means for directing the flow of fluid to the set roll adjusting motor, a press roll frame slidably mounted on said base, a plurality of rollers rotatably mounted in said press roll frame, a second fluid operated rotary motor operably connected to said rollers in said press roll frame, valve means for controlling said second fluid operated rotary motor, an hydraulic cylinder, a piston therein operatively connected to said press roll frame, valve means for directing the flow of fluid to the respective sides of said piston in said hydraulic cylinder whereby to secure the reciprocation thereof and the lateral adjustment of said press roll frame and the exertion of clamping pressure by the rollers therein, a variable displacement rotary pump, conduit means interconnecting the same and said first and said second rotary hydraulic motors and the valve means therefor, an hydraulic pump, conduit means interconnecting the same and the set roll adjusting motor and the valve means therefor, a constant displacement variable pressure pump, and conduit means interconnecting the same and said second hydraulic cylinder and the valve means therefor.

DONALD H. BOOKHULTZ.
GEORGE E. ZWEIFEL.

REFERENCES CITED

The following references are of record in the file of this patent:

UNITED STATES PATENTS

| Number | Name | Date |
|---|---|---|
| 370,413 | Rinkerknecht | Sept. 27, 1887 |
| 812,987 | Garland | Feb. 20, 1906 |
| 815,955 | Graham | Mar. 27, 1906 |
| 958,853 | Bulley | May 24, 1910 |
| 1,193,267 | Johnson | Aug. 1, 1916 |
| 1,832,908 | Langill et al. | Nov. 24, 1931 |
| 1,999,834 | Ernst | Apr. 30, 1935 |
| 2,056,896 | Douglas | Oct. 6, 1936 |
| 2,332,888 | Bostwick et al. | Oct. 26, 1943 |
| 2,365,095 | Miller et al. | Dec. 12, 194 |